(12) United States Patent
Zhang et al.

(10) Patent No.: US 8,458,773 B2
(45) Date of Patent: Jun. 4, 2013

(54) METHOD, DEVICE, AND SYSTEM FOR AUTHENTICATION (75) Inventors: Wei Zhang, Shenzhen (CN); Liang Gu, Shenzhen (CN); Wenliang Liang, Shenzhen (CN); Yuhua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 12/846,190

(22) Filed: Jul. 29, 2010

(65) Prior Publication Data
US 2010/0293603 A1    Nov. 18, 2010

Related U.S. Application Data (63) Continuation of application No. PCT/CN2009/070246, filed on Jan. 21, 2009.

(30) Foreign Application Priority Data

Jan. 30, 2008    (CN) .......................... 2008 1 0000293

(51) Int. Cl.
*G06F 21/00*    (2006.01)
(52) U.S. Cl.
USPC .............................................. 726/4; 370/328
(58) Field of Classification Search
None
See application file for complete search history.

(56) References Cited

U.S. PATENT DOCUMENTS

2007/0201697 A1*    8/2007    Altshuller et al. ............ 380/247
2008/0101291 A1*    5/2008    Jiang et al. .................... 370/331
2010/0293603 A1    11/2010    Zhang et al.

FOREIGN PATENT DOCUMENTS

| CN | 101064605 | 10/2007 |
|----|-----------|---------|
| CN | 101499993 | 7/2012  |

OTHER PUBLICATIONS

Pascal Urien, "Designing Smartcards for Collaboration with the Wi/MAX Security Sublayer" 2007, pp. 37-45.
Evren Eren "Wi/MAX Security Architecture-Analysis and Assessment" IEEE International Workshop on Intelligent Date Acquisition and Advanced Computing Systems: Technology and Applications, Sep. 6-8, 2007, Dormund, Germany, pp. 673-677.
International Preliminary Report on Patentability issued Aug. 3, 2010 in corresponding International Patent Application No. PCT/CN2009/070246 (5 pages) (5 pages English Translation).
Written Opinion of the International Searching Authority mailed Apr. 30, 2009 in corresponding International Patent Application No. PCT/CN/2009/070246 (10 pages) (4 pages English Translation).

(Continued)

*Primary Examiner* — Brandon Hoffman
*Assistant Examiner* — Nega Woldemariam
(74) *Attorney, Agent, or Firm* — Staas & Halsey LLP (57) ABSTRACT

A method for authentication includes: a Gateway Mobile Station (G-MS) receives an authentication trigger message from a host, and sends the authentication trigger message to an authentication server through an Ethernet Convergence Sublayer (Eth-CS) to trigger authentication. A network system includes a G-MS, which is connected to a host and an authentication server in communicable mode. The G-MS is configured to: receive an authentication trigger message from the host and send the authentication trigger message to the authentication server through the Eth-CS. The authentication server is configured to: receive the authentication trigger message that the G-MS sends through the Eth-CS, and authenticate the host. A G-MS includes: a receiving unit, configured to receive an authentication trigger message from the host; and a sending unit, configured to send the authentication trigger message received by the receiving unit to the authentication server through the Eth-CS.

15 Claims, 4 Drawing Sheets

OTHER PUBLICATIONS

Chinese Office Action mailed Oct. 19, 2011 issued in corresponding Chinese Patent Application No. 200810000293.8.
International Search Report, mailed Apr. 30, 2009, in corresponding International Application PCT/CN2009/070246 (7 pp.).

Ma Nan et al. "WiMAX Network Architecture and Ethernet CS Design and Optimization," Telecom Engineering College, Beijing University of Posts and Communications, Beijing 100876, Jun. 2006 (4 pages) (1 page English abstract).

* cited by examiner

METHOD, DEVICE, AND SYSTEM FOR AUTHENTICATION

CROSS-REFERENCE TO RELATED APPLICATIONS

This application is a continuation of International Application No. PCT/CN2009/070246, filed on Jan. 21, 2009, which claims priority to Chinese Patent Application No. 200810000293.8, filed on Jan. 30, 2008, both of which are hereby incorporated by reference in their entireties.

FIELD OF THE INVENTION

The present invention relates to a communications technology, and in particular, to a method, device, and system for authentication.

BACKGROUND OF THE INVENTION

Worldwide Interoperability for Microwave Access (WiMAX) is a new air interface standard for microwave and millimeter wave frequency bands. WiMAX connects the wireless access point of the Institute of Electrical and Electronics Engineers (IEEE) 802.11a to the Internet. It may also connect enterprise and home environments to a wired backbone line. In addition, WiMAX may be used as a wireless extension technology of the cable and Digital Subscriber Line (DSL) to implement wireless broadband access.

Figure 1:
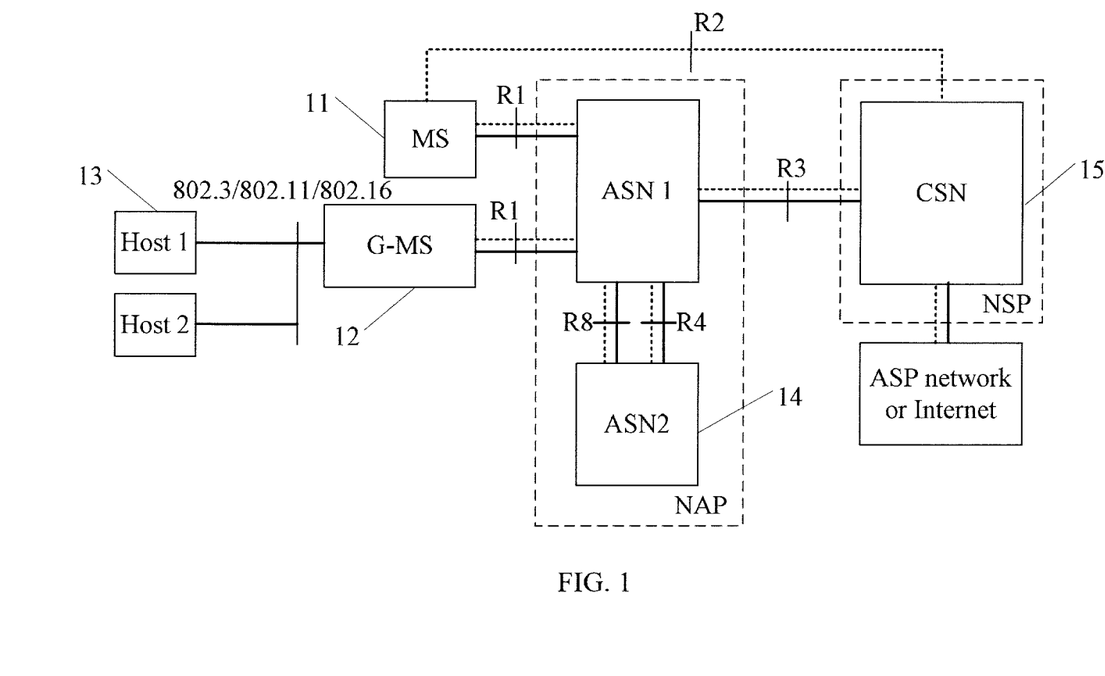
FIG. 1 illustrates network architecture of a WiMAX system with multiple hosts in the prior art.

The WiMAX network based on the IEEE 802.16 standard can provide a higher access rate. FIG. 1 shows network architecture of a WiMAX system with multiple hosts in the prior art. This network architecture includes a Mobile Station (MS) 11, a Gateway Mobile Station (G-MS) 12 and a host 13 of the G-MS 12, an Access Service Network (ASN) 14, and a Connectivity Service Network (CSN) 15.

In FIG. 1, the MS is a mobile terminal device, through which a user accesses the WiMAX network; the ASN includes a Base Station (BS) and an Access Service Network Gateway (ASN-GW), and is a set of network functions providing wireless access services on the WiMAX terminal device. The ASN includes the following function entities: Physical and Media Access Control Function (PHY/MAC Function), Data Path Function (DPF), authenticator, Service Flow Authorization (SFA), and external agent.

In a WiMAX system with multiple hosts, the host of the G-MS accesses the BS through the IEEE802.3/802.11/ 802.16 link; the G-MS is connected to the BS via the R1 interface; the BSs of the Network Access Provider (NAP) are connected via the R8 interface; the BS is connected to the ASN-GW via the R6 interface; the ASN GWs are connected via the R4 interface, and the ASN-GW is connected to the CSN of the NSP via the R3 interface.

In the prior art, there is no authentication method based on the Ethernet Convergence Sublayer (Eth-CS).

SUMMARY OF THE INVENTION

Embodiments of the present invention provide a method, device and system for authentication based on the Eth-CS.

To achieve the above objective, the following technical solution is provided in embodiments of the present invention:

A method for authentication includes:

receiving, by a G-MS, an authentication trigger message from a host; and sending, by the G-MS, the authentication trigger message to an authentication server through an Eth-CS to trigger authentication.

A network system includes a G-MS that is connected to a host and an authentication server in communicable mode. The G-MS is configured to: receive an authentication trigger message from the host, and send the authentication trigger message to the authentication server through an Eth-CS.

The authentication server is configured to: receive the authentication trigger message that the G-MS sends through the Eth-CS, and authenticate the host.

Another G-MS includes a receiving unit and a sending unit.

The receiving unit is configured to receive an authentication trigger message from a host.

The sending unit is configured to send the authentication trigger message received by the receiving unit to an authentication server through an Eth-CS.

A DPF includes a receiving unit, a data filtering unit, and a sending unit.

The receiving unit is configured to receive a message borne by an Eth-CS.

The data filtering unit is configured to: filter the message received by the receiving unit, and notify the sending unit of sending the authentication trigger message if the received message is an authentication trigger message or knowing in advance that the message transmitted on a service flow is an authentication trigger message.

The sending unit is configured to send the authentication trigger message to the authentication server.

In the technical solution provided in embodiments of the present invention, when the G-MS receives an authentication trigger message from a host, the G-MS may send the authentication trigger message to the authentication server through the Eth-CS to trigger the authentication. Thus, the host authentication based on the Eth-CS can be performed in a multi-host scenario.

DETAILED DESCRIPTION OF THE EMBODIMENTS

Embodiments of the present invention provide a method, device, and system for authentication. For better understanding of the objective, technical solution, and merit of the technical solution, the technical solution is hereinafter described in detail with reference to the accompanying drawings.

A method for authentication in an embodiment of the present invention includes:

A G-MS receives an authentication trigger message from a host, and sends the authentication trigger message to the authentication server through an Eth-CS to trigger authentication.

The G-MS sends the authentication trigger message to the authentication server through the Eth-CS to trigger the authentication, so that the host authentication based on the Eth-CS can be performed.

The following describes this method with reference to specific scenarios.

Figure 2:
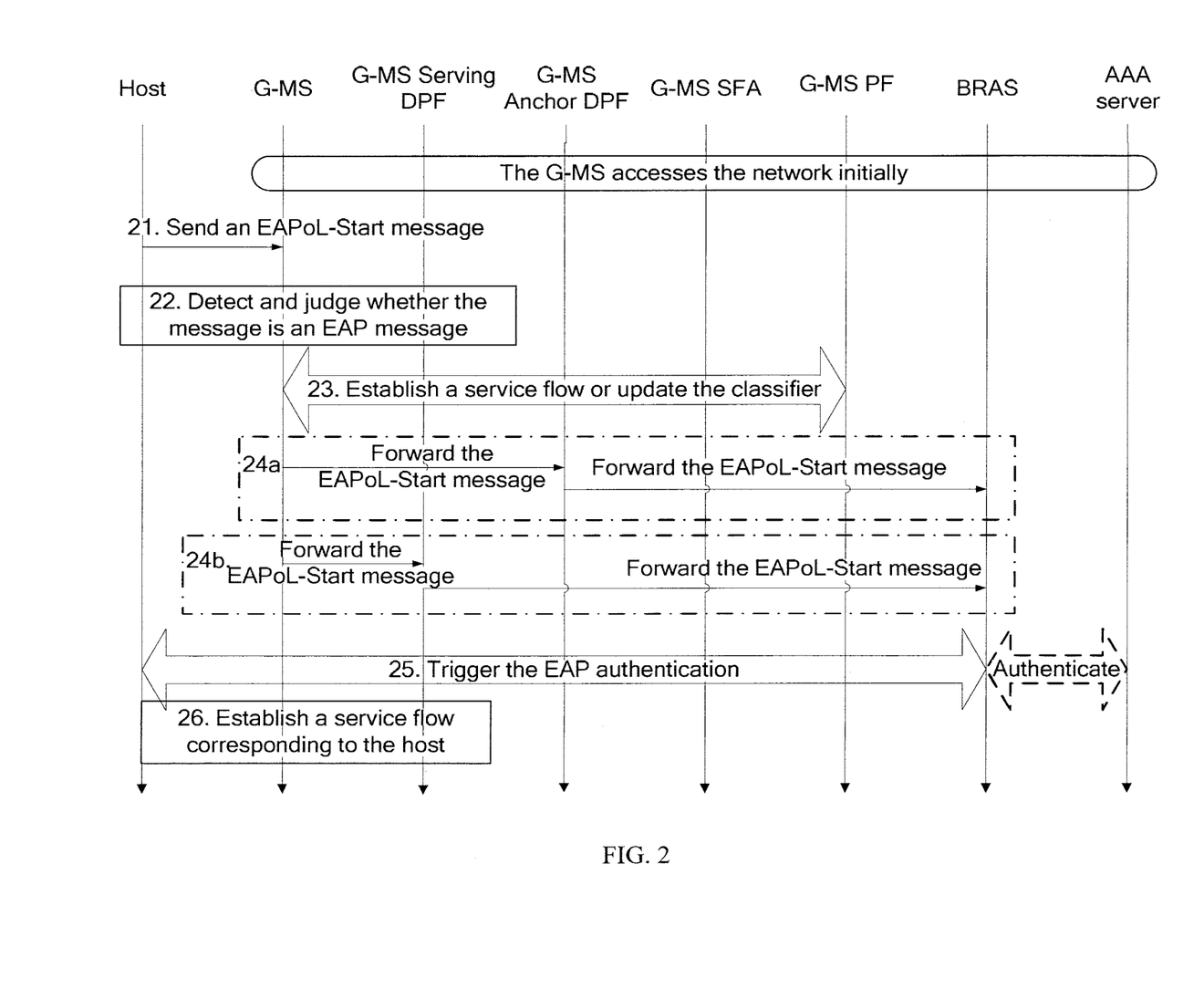
FIG. 2 illustrates a signaling process of authenticating a host over the Extensible Authentication Protocol over LAN (EAPoL) in an embodiment of the present invention.

FIG. 2 shows a signaling process of authenticating the host over the Extensible Authentication Protocol over LAN (EAPoL). The process includes the following steps:

Step 21: The host sends an EAPoL-Start message to the G-MS to trigger the start of the EAP authentication.

The EAPoL-Start message is used to trigger the EAP authentication process. EAPoL is a protocol for bearing an EAP authentication message over the LAN, and is a data link layer protocol.

Step 22: The G-MS receives the EAPoL-Start message from the host, judges whether the message is an EAPoL message, and sends the EAPoL message sent from the host to the network to trigger the authentication In this embodiment, the G-MS judges whether the message is an EAPoL message according to the protocol type carried in the message sent from the host, and sends the EAPoL message sent from the host to the network to trigger the authentication. The G-MS can obtain the identifier of the host sending this message according to the source MAC address of the message. The G-MS can ignore the messages sent from the host that is not authenticated.

Step 23: To bear the EAPoL message, optionally, the G-MS may establish a new Eth-CS service flow or use an existing Eth-CS service flow.

The G-MS may establish a new service flow or use an existing service flow to bear the EAPoL message. If the G-MS uses the existing service flow, it may update the existing service flow classifier, so that the DPF can classify downlink data to a proper service flow when forwarding the downlink data and the MS can classify the uplink data correctly.

If the G-MS uses its own initial service flow to bear the data sent from the host, step 23 can be omitted.

Step 24: The G-MS sends the EAPoL-Start message to the authentication server.

Specifically, in this embodiment, the authentication server may be a Broadband Remote Access Server (BRAS) or an Authentication, Authorization, and Accounting (AAA) server.

Multiple methods may be available to implement this step. The following describes two methods with reference to FIG. 2.

24*a*. The G-MS forwards the EAPoL-Start message to the network through a service flow based on the Eth-CS; the G-MS anchor DPF may detect that the message is an EAPoL message by using the data classification function or know that the data transmitted on the service flow is an EAPoL message in advance; when the message needs to be sent to networks supporting EAPoL authentication such as a DSL network, the G-MS anchor DPF forwards the EAPoL-Start message to the BRAS.

24*b*. The G-MS forwards the EAPoL-Start message to the network. If the G-MS Serving DPF detects that the message is an EAPoL message, the G-MS Serving DPF sends the message to the BRAS through the Eth-CS.

The specific detection and forwarding mechanism of the G-MS Serving DPF is the same as that in step 24*a*, and thus is not further described.

Or, after detecting the EAPoL message, the G-MS Anchor DPF or the G-MS Serving DPF converts the EAPoL message into an EAP over Remote Authentication Dial In User Server (EAP over RADIUS) message; the authenticator sends the obtained RADIUS message to the AAA server. Subsequent processes are the same as the access processes of the MS in the prior art, and thus are not further described. In this case, the G-MS anchor DPF or the G-MS Serving DPF and the authenticator are bound to the same physical entity.

Step 25: After receiving the EAPoL-Start message, the BRAS triggers the EAP authentication on the host.

The host communicates with the BRAS through EAP messages to perform the authentication. The specific EAP authentication method may be the EAP method in the prior art, and thus is not further described.

Optionally, if the BRAS does not support the authentication function, the BRAS may forward the EAPoL message to the AAA server. The BRAS communicates with the AAA server to perform the authentication. In this case, the BRAS acts as the proxy server of the AAA server.

Further, in this embodiment, if knowing that the host passes the authentication, the Network Element (NE) on the network may initiate a service flow establishment process. Details are as follows: If knowing that the host passes the authentication, the G-MS SFA, the G-MS Anchor DPF or the G-MS Serving DPF initiates a process of establishing a service flow for the host. The message in the service flow establishment process carries the host identifier, service flow identifier, and service flow parameter and may further carry information such as Quality of Service (QoS) or service flow classifier.

Step 26: The G-MS establishes a service flow corresponding to the host. After receiving a message sent from the host, the G-MS maps the host data to the service flow corresponding to the host through the service flow classifier for transmission.

In the embodiments, the G-MS uses the Eth-CS to bear the EAPoL message; the G-MS Serving DPF or the G-MS DPF forwards the message to the BRAS or the AAA server to the trigger the BRAS authentication or the AAA authentication. Thus, the host authentication is performed based on the message borne by the Eth-CS in a multi-host scenario.

In addition, after the authentication succeeds, the NE on the network can perceive the host authentication result, so that the NE can initiate a process of establishing a service flow for the host.

Figure 3:
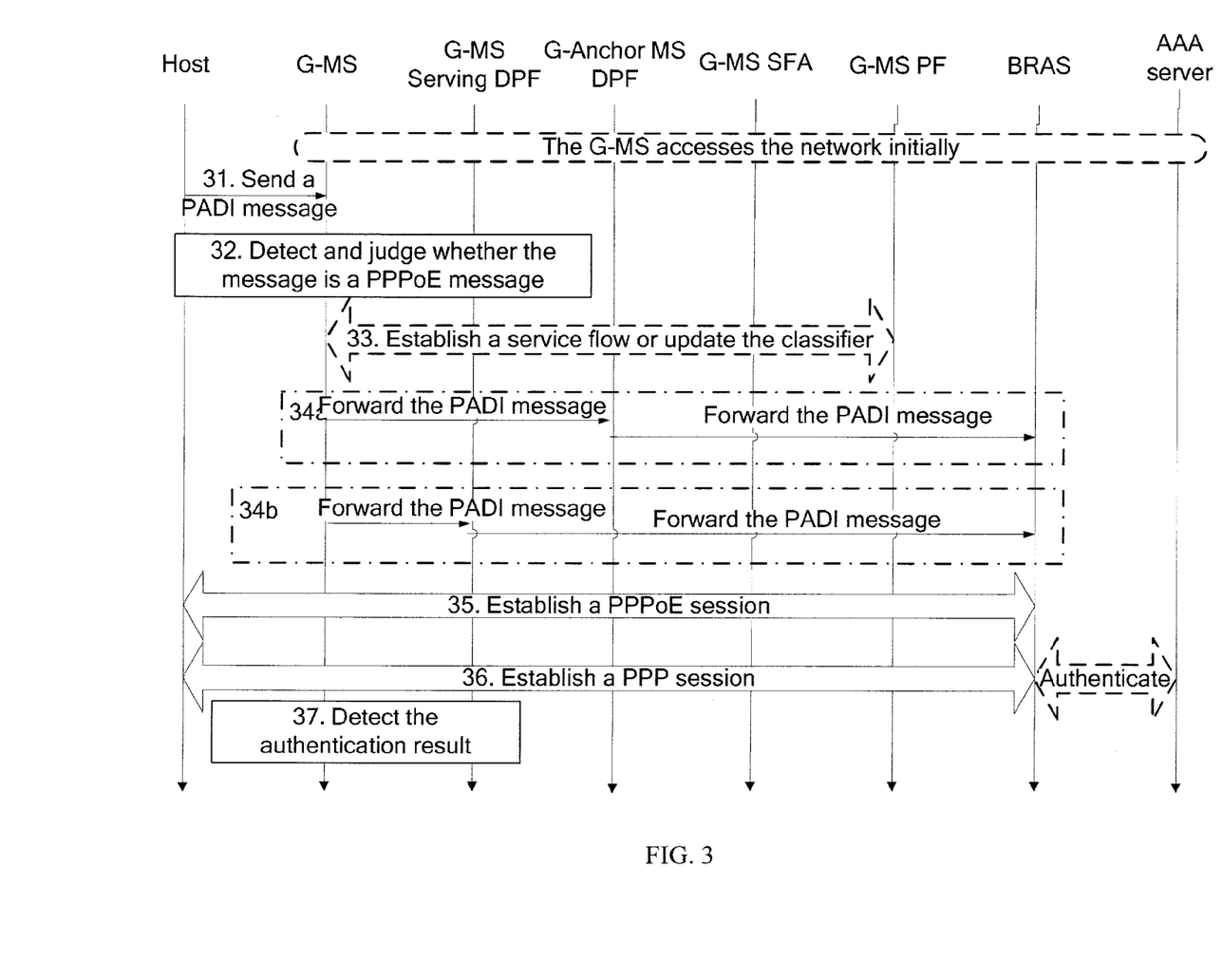
FIG. 3 illustrates a signaling process of authenticating a host over the Point-to-Point Protocol over Ethernet (PPPoE) in an embodiment of the present invention.

FIG. 3 shows a signaling process of authenticating the host over PPPoE. The process includes the following steps:

Step 31: The host sends a PPPoE Active Discovery Initiation (PADI) broadcast message.

The PADI broadcast message is used to discover the peer MAC address and obtain the PPPoE session identifier.

Step 32: The G-MS receives messages from the host, and sends the PPPoE message or Point-to-Point Protocol (PPP) message sent from the host to the network through the Eth-CS to trigger the authentication.

The G-MS may judge whether the message is a PPPoE message or a PPP message according to the protocol type carried in the message sent from the host, and send the PPPoE message or the PPP message sent from the host to the network to trigger the authentication. The G-MS may ignore the messages sent from the host that is not authenticated.

Step 33: To bear the PPPoE message, optionally, the G-MS may establish a new Eth-CS service flow or use an existing Eth-CS service flow.

The G-MS may establish a new service flow or use an existing service flow, to bear the PPPoE message. If the G-MS uses the existing service flow, the G-MS may update the existing service flow classifier, so that the DPF can classify downlink data to a proper service flow when forwarding the downlink data and that the MS can classify the uplink data correctly.

If the G-MS uses its own initial service flow to bear the data sent from the host, step 33 can be omitted.

Step 34: The G-MS sends the PADI message to the authentication server, triggering the authentication server to authenticate the host.

In this embodiment, the authentication server may be the BRAS, the AAA server, or other authentication servers.

Multiple methods may be available to implement this step. The following describes two methods with reference to FIG. 3.

34a. The G-MS forwards the PADI message to the network through a service flow based on the Eth-CS; the G-MS Anchor DPF may detect that the message is a PPPoE message by using the data classification function or know that the message transmitted on the service flow is a PPPoE message in advance; when the message needs to be sent to networks supporting PPPoE and/or PPP authentication such as a DSL network, the G-MS Anchor DPF forwards the PADI message to the BRAS.

34b. The G-MS forwards the PADI message to the network. The G-MS Serving DPF detects that the data is authentication data, and sends the message to the BRAS directly.

The specific judgment mechanism of the G-MS Serving DPF is the same as that in step 34a, and is thus not further described.

Or, after detecting the PADI message, the G-MS Anchor DPF or the G-MS Serving DPF converts the PADI message into an EAP over RADIUS message; the authenticator sends the obtained RADIUS message to the AAA server. Subsequent processes are the same as the MS access processes in the prior art, and are thus not further described. In this case, the G-MS Anchor DPF or the G-MS Serving DPF and the authenticator are bound to the same physical entity.

Step 35: The host establishes a PPPoE session with the BRAS.

After receiving the PADI message from the host, the BRAS returns a PPPoE Active Discovery Offer (PADO) message through the preceding Eth-CS. Then, the host may exchange a PPPoE Active Discovery Request/PPPoE Active Discovery Session-confirmation (PADR/PADS) signaling message with the BRAS to establish a PPPoE session.

Step 36: The host establishes a PPP session with the BRAS to perform the authentication.

The host establishes a PPP session with the BRAS, including processes of establishing the Link Control Protocol (LCP) connection and performing authentication over the Password Authentication Protocol (PAP), the Challenge-Handshake Authentication Protocol (CHAP) or the EAP, and the Network Control Protocol (NCP) process negotiated in the phase of establishing the LCP connection.

Optionally, if the BRAS does not support the authentication, the BRAS may forward the PADI message to the AAA server. The BRAS communicates with the AAA server to perform the authentication. In this case, the BRAS acts as the proxy server of the AAA server.

If knowing that the host authentication succeeds, the G-MSSFA, the G-MS Anchor DPF, or the G-MS Serving DPF may initiate a process of establishing a service flow corresponding to the host.

Step 37: The G-MS detects the PPP authentication result, and creates a new ingress entry according to the authentication result.

In this technical solution, the host authentication is implemented by using the Eth-CS to bear the PPPoE message triggering the authentication.

In addition, after the authentication succeeds, the NE on the network can perceive the host authentication result, so that the NE can initiate a process of establishing a service flow for the host.

In the preceding embodiment, the authentication trigger message of the host is sent to the BRAS or the AAA server through the G-MS, and may also be forwarded by the G-MS Anchor DPF or the G-MS Serving DPF.

For better description, the G-MS Anchor DPF and the G-MS Serving DPF may be briefly called the DPF. The DPF in the following description refers to the G-MS Anchor DPF or the G-MS Serving DPF.

When the authentication trigger message is forwarded by the DPF, data communications based on the Eth-CS need to be performed between the DPF and the BRAS. Using the DPF to forward the authentication trigger message solves the problem of the association information between the DPF and the BRAS/AAA server. Details are hereinafter given with reference to some scenarios.

The DPF may find the authentication server such as the BRAS or the AAA server by using the following three methods:

a. The DPF is pre-configured with the information of the BRAS or the AAA server, and the BRAS or the AAA server can perform Eth-CS data communications with the DPF. When the DPF receives an authentication trigger message from the host, the DPF forwards the authentication trigger message to the pre-configured BRAS or AAA server to trigger the authentication.

b. The DPF may not be pre-configured with the information of the BRAS or the AAA server. When receiving an authentication trigger message from the host, the DPF sends the authentication trigger message to a reachable BRAS or AAA server to perform the authentication.

c. The DPF selects a corresponding BRAS or AAA server according to the field information or service information, for example, the name of server in the PPPoE, specified by the user identifier information in the authentication trigger message.

In the authentication process, the DPF and the BRAS or the AAA server may store their association (that is, the association information between the DPF and the BRAS or the association information between the DPF the AAA server). The association information may include but is not limited to information of the MAC address of the host, address of the DPF, address of the BRAS or the AAA server and session ID.

If the DPF is migrated, the association information needs to be updated.

If the host needs to be re-authenticated after accessing the network, the re-authentication may be performed according to the current association between the DPF and the BRAS or the AAA server.

If the host initiates the re-authentication due to the migration of the DPF, the following methods may be used.

1. The host sends an authentication trigger message carrying the address of the authentication server (the BRAS or the AAA server), that is, the well-known MAC address, to the G-MS. The G-MS sends the authentication trigger message to the migrated DPF through the Eth-CS. The migrated DPF forwards the authentication trigger message to the authentication server (the BRAS or the AAA server) selected by the migrated DPF to trigger the authentication. The migrated DPF may be pre-configured with the information of the authentication server (the BRAS or the AAA server), and send the authentication trigger message to the authentication server (the BRAS or the AAA server); or the migrated DPF may select a reachable authentication server (the BRAS or the AAA server), and send the authentication trigger message to the authentication server (the BRAS or the AAA server) to trigger the authentication.

2. The host sends an authentication trigger message carrying the address of the old BRAS or the old AAA server; after receiving the authentication trigger message, the migrated DPF obtains the address of the old authentication server (the BRAS or the AAA server), and forwards the authentication trigger message to an authentication server corresponding to the address of the old authentication server (the BRAS or the AAA server) to trigger the authentication.

3. The host sends an authentication trigger message that carries the address of the old authentication server (the BRAS or the AAA server); after receiving the authentication trigger message, the migrated DPF obtains the address of the old authentication server (the BRAS or the AAA server), and processes the messages in the authentication in the following ways: changing the destination address (for example, the destination MAC address) in an uplink message (the message that the host sends to the authentication server) to the address of the migrated authentication server (the BRAS or the AAA server), and forwarding the message to the migrated authentication server (the BRAS or the AAA server) to trigger the authentication; changing the source address (for example, the source MAC address) in a received downlink message (the message that the authentication server sends to the host) to the address of the old authentication server (the BRAS or the AAA server), and sending the message. In this way, the migration of the authentication server is invisible to the host.

If the BRAS or AAA server migrates due to the migration of the DPF, the host related information stored in the old BRAS or the old AAA server may be released, including the host security information and/or the association information between the BRAS or the AAA server and the old DPF. The method for releasing the host related information may include: if the BRAS or the AAA server is migrated during the migration of the DPF, the DPF triggers the old BRAS or the old AAA server to release the information; or the DPF triggers the old BRAS or the old AAA server to release the host related information during the re-authentication.

In this embodiment, the DPF stores the association information between the DPF and the BRAS or the AAA server. In this way, the authentication based on the Eth-CS may be implemented in scenarios where the DPF is migrated by using the method provided in this embodiment.

What has been described above is the method for authentication in embodiments of the present invention. For better understanding and implementation of the present invention by those skilled in the art, the following describes the network system in detail with reference to the accompanying drawings.

Figure 4:
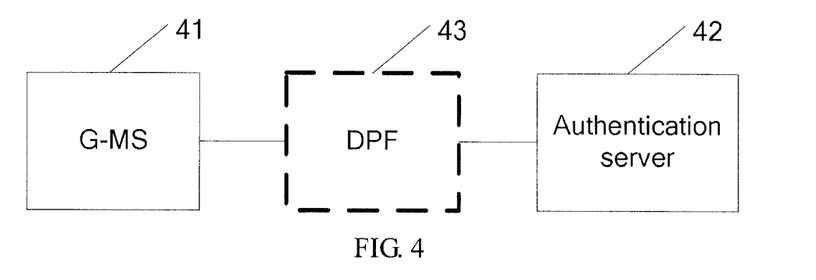
FIG. 4 shows a structure of a network system in an embodiment of the present invention.

FIG. 4 shows a structure of the network system in an embodiment of the present invention. The network system includes a G-MS 41, which is connected to a host and an authentication server 42 in communicable mode. The G-MS 41 is configured to: receive an authentication trigger message from the host, and send the authentication trigger message to the authentication server 42 through the Eth-CS.

The authentication server 42 is configured to: receive an authentication trigger message that the G-MS 41 sends through the Eth-CS, and authenticate the host.

By using the network system, the G-MS sends an authentication trigger message borne by the Eth-CS to the authentication server to trigger the authentication on the host, so that the multi-host authentication may be performed based on the Eth-CS.

Specifically, the authentication trigger message in this embodiment may be an EAPoL-Start message or a PADI message. The authentication server may be the AAA server or the BRAS. When the authentication server is the AAA server, the authentication trigger message may be forwarded by the BRAS. In this case, the BRAS acts as the proxy server of the AAA server.

Optionally, the authentication trigger message in this embodiment may be forwarded through an intermediate NE, for example, the G-MS Anchor DPF or the G-MS Serving DPF. When the authentication trigger message is forwarded through the DPF, the DPF may be associated with the authentication server.

As shown in FIG. 4, the network system may further include a DPF 43, which is configured to: receive an authentication trigger message borne by the Eth-CS from the G-MS 41, and forward the authentication trigger message to the authentication server 42 when detecting that the message is an authentication trigger message by using the data classification function or knowing that the message transmitted on the service flow is an authentication trigger message.

Further, the DPF 43 and the authentication server 42 in this embodiment may store their association.

If the authentication server 42 is migrated, the host related information stored in the old authentication server may be released to ensure the security of the information, which includes host security information and the association information between the authentication server and the old DPF.

In this embodiment, if the host initiates the re-authentication due to the migration of the DPF 43, the DPF 43 may be further configured to receive the authentication trigger message sent from the host and forward the authentication trigger message to an authentication server (the BRAS or the AAA server) selected by the DPF 43 to trigger the authentication.

The DPF 43 in the network system may be further configured to: receive an authentication trigger request that the host sends in the case of re-authentication, where the authentication trigger request carries the address of the old authentication server (the BRAS or the AAA server) or an initial MAC address indicating the address of the old authentication server (the BRAS or the AAA server); obtain the address, and forward the authentication trigger request to the corresponding authentication server to trigger the authentication.

The DPF in the network system may be further configured to: receive an authentication trigger message that the host sends in the case of re-authentication; change the destination address in the authentication trigger message from the address of the old authentication server (the BRAS or the AAA server) to the address of the migrated authentication server (the BRAS or the AAA server), and forward the message to the migrated authentication server (the BRAS or the AAA server) to trigger the authentication; change the source address (for example, the source MAC address) in an authentication trigger response message returned by the authentication server (the BRAS or the AAA server) to the address of the old authentication server (the BRAS or the AAA server), and send the authentication trigger response message. In this way, the migration of the authentication server (the BRAS or the AAA server) to the host.

By using the system provided in this embodiment, the G-MS sends the authentication trigger message to the authentication server through the Eth-CS to trigger the authentication, so that the host authentication based on the Eth-CS is performed.

What has been described above are the method for authentication and the network system provided in embodiments of the present invention. For better understanding and implementation of the present invention by those skilled in the art, the following describes the communication device used in embodiments of the present invention.

Figure 5:
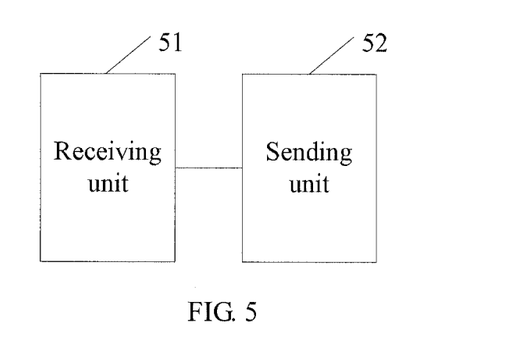
FIG. 5 shows a structure of a G-MS in an embodiment of the present invention.

FIG. 5 shows a structure of a G-MS in an embodiment of the present invention. The G-MS includes a receiving unit 51 and a sending unit 52.

The receiving unit 51 is configured to receive an authentication trigger message from the host.

The sending unit 52 is configured to send the authentication trigger message received by the receiving unit 51 to the authentication server through the Eth-CS.

The G-MS is configured to send the authentication trigger message sent from the host to the authentication server through the Eth-CS and trigger the authentication server to authenticate the host. In this way, the host authentication based on the Eth-CS is implemented.

Figure 6:
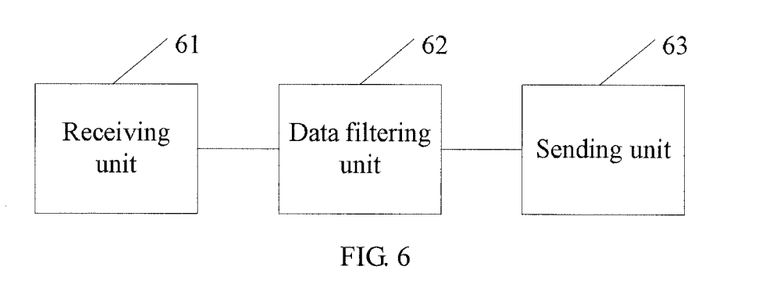
FIG. 6 shows a structure of a DPF in an embodiment of the present invention.

A DPF is also provided in an embodiment of the present invention. As shown in FIG. 6, the DPF includes a receiving unit 61, a data filtering unit 62, and a sending unit 63.

The receiving unit 61 is configured to receive a message borne by the Eth-CS.

The data filtering unit 62 is configured to: filter the message received by the receiving unit 61, and instruct the sending unit 63 to send the authentication trigger message if the received message is an authentication trigger message or knowing in advance that the message transmitted on the service flow is an authentication trigger message.

The sending unit 63 is configured to send the authentication trigger message to the authentication server.

Optionally, the DPF may further include a storing unit, which is configured to store the association information between the DPF and the authentication server.

By using the DPF in this embodiment, the authentication trigger message borne by the Eth-CS may be forwarded to the authentication server to trigger the authentication server to authenticate the host. Thus, the host authentication based on the Eth-CS is implemented.

It is understandable by those skilled in the art that all or part of the steps of the method according to the embodiments of the present invention may be implemented by a program instructing relevant hardware. The program may be stored in a computer readable storage medium. When the program runs, the following steps are involved:

1. The G-MS receives an authentication trigger message from the host.

2. The G-MS sends the authentication trigger message to an authentication server through the Eth-CS to trigger the authentication.

The storage medium may be a Read-Only Memory (ROM), a magnetic disk, or a Compact Disk Read-Only Memory (CD-ROM).

Detailed above are a method, device, and system for authentication of the present invention. Those skilled in the art can make variations and modifications to the present invention in terms of the specific implementations and application scopes according to the ideas of the present invention. Therefore, the specifications shall not be construed as limitations to the present invention.

What is claimed is:

1. A method for authentication, wherein the method is applied in a system comprising one or more hosts and a Gateway Mobile Station (G-MS), the one or more hosts are connected with the G-MS and the method comprises:

receiving, by the G-MS, an authentication trigger message from a host; and sending, by the G-MS, the authentication trigger message to an authentication server through an Ethernet Convergence Sublayer (Eth-CS) to trigger authentication, wherein the step of sending, by the G-MS, the authentication trigger message to an authentication server through an Eth-CS comprises:

sending, by the G-MS, the authentication trigger message to a Data Path Function (DPF) through the Eth-CS; and forwarding, by the DPF, the authentication trigger message to the authentication server when detecting that the message sent from the G-MS is an authentication trigger message or knowing in advance that the message transmitted on a service flow is an authentication trigger message.

2. The method of claim 1, wherein the authentication sever is a pre-configured authentication server or a reachable authentication server.

3. The method of claim 1, further comprising:

storing, by the DPF and the authentication server, association information between the DPF and the authentication server.

4. The method of claim 3, further comprising:

if the DPF is migrated, updating the association information between the DPF and the authentication server.

5. The method of claim 3, further comprising:

if the authentication server is migrated, releasing host related information stored in an old authentication server, wherein the host related information comprises the association information between the old authentication server and the DPF.

6. The method of claim 1, wherein if a migration of the DPF triggers re-authentication on the host, the method further comprises:

sending, by the G-MS, an authentication trigger message to the migrated DPF through the Eth-CS; and forwarding, by the migrated DPF, the authentication trigger message to an authentication server selected by the migrated DPF, wherein the authentication trigger message carries an initial Media Access Control (MAC) address indicating an address of an old authentication server.

7. The method of claim 1, wherein if a migration of the DPF triggers re-authentication on the host, the method further comprises:

sending, by the G-MS, an authentication trigger message to the migrated DPF through the Eth-CS; obtaining, by the migrated DPF, an address of an old authentication server from the authentication trigger message, and forwarding, by the migrated DPF, the authentication trigger message to an authentication server corresponding to the address of the old authentication server.

8. The method of claim 1, wherein if a migration of the DPF triggers re-authentication on the host, the method further comprises: sending, by the G-MS, an authentication trigger message to a migrated DPF through the Eth-CS; changing, by the migrated DPF, a destination address in an uplink message to an address of a migrated authentication server during the authentication, and changing, by the migrated DPF, a source address in a downlink message returned by the migrated authentication server to an address of an old authentication server during the authentication.

9. The method of claim 1, wherein before the step of sending, by the G-MS, the authentication trigger message to an authentication server through an Eth-CS, the method further comprises:

by the G-MS, establishing a service flow of the Eth-CS or using an existing service flow, to bear data sent by the host.

10. A network system, comprising a Gateway Mobile Station (G-MS) that is connected to a host and an authentication server in communicable mode wherein:

the G-MS is configured to receive an authentication trigger message from the host and send the authentication trigger message to the authentication server through an Ethernet Convergence Sublayer (Eth-CS);

the authentication server is configured to receive the authentication trigger message that the G-MS sends through the Eth-CS and authenticate the host; and the network system further comprises a Data Path Function (DPF), configured to receive the authentication trigger message borne by the Eth-CS from the G-MS and forward the authentication trigger message to the authentication server when detecting that the message sent from the DPF is an authentication trigger message by using a data classification function or knowing in advance that the message transmitted on a service flow is an authentication trigger message.

11. The network system of claim 10, wherein the DPF is further configured to store association information between the DPF and the authentication server; and the authentication server is further configured to store the association information between the authentication server and the DPF.

12. The network system of claim 10, wherein:

the DPF is further configured to receive an authentication trigger message sent from the host in the case of re-authentication and forward the authentication trigger message to an authentication server selected by the DPF to trigger authentication, wherein the authentication trigger message carries an address of an old authentication server or an initial Media Access Control (MAC) address indicating the address of the old authentication server.

13. The network system of claim 10, wherein:

the DPF is further configured to receive an authentication trigger message sent from the host in the case of re-authentication, change a destination address in the authentication trigger message from an address of an old authentication server to an address of a migrated authentication server, and send the authentication trigger message to the migrated authentication server; change a source address in an authentication response message returned by the migrated authentication server to the address of the old authentication server, and send the authentication response message to the host.

14. A Data Path Function (DPF), comprising a receiver, a processor, and a transmitter, wherein:

the receiver is configured to receive a message borne by an Ethernet Convergence Sublayer (Eth-CS) from a Gateway Mobile Station (G-MS);

the processor is configured to: filter the message received by the receiver, and instruct the transmitter to send the authentication trigger message if the received message is an authentication trigger message or knowing in advance that the message transmitted on a service flow is an authentication trigger message; and the transmitter is configured to send the authentication trigger message to an authentication server.

15. The DPF of claim 14, further comprising:

a storage, configured to store association information between the DPF and the authentication server.

* * * * *